United States Patent [19]

Shida et al.

[11] 4,433,093

[45] Feb. 21, 1984

[54] ANTI-CREVICE CORROSION SEALANT AND METHOD FOR ANTI-CREVICE CORROSION

[75] Inventors: Shigeru Shida, Hitachi; Nobuyoshi Hosaka, Ibaraki; Yuichi Ishikawa, Mito; Osamu Nishida, Saitama, all of Japan

[73] Assignee: Hitachi, Ltd., Tokyo, Japan

[21] Appl. No.: 460,017

[22] Filed: Jan. 21, 1983

[30] Foreign Application Priority Data

Jan. 25, 1982 [JP] Japan .................................. 57-8917
Jan. 25, 1982 [JP] Japan .................................. 57-8918

[51] Int. Cl.$^3$ ........................... C08K 3/10; C08K 3/02
[52] U.S. Cl. .................................. 524/433; 524/439; 428/471
[58] Field of Search ................. 524/433, 439; 427/471

[56] References Cited

U.S. PATENT DOCUMENTS

| | | | |
|---|---|---|---|
| 3,717,600 | 2/1973 | Dalhuisen et al. | 524/433 |
| 3,751,525 | 8/1973 | Brenner et al. | 524/433 |
| 3,933,719 | 1/1976 | Iwai et al. | 524/433 |

FOREIGN PATENT DOCUMENTS

| | | | |
|---|---|---|---|
| 48-29780 | 9/1973 | Japan | 524/433 |
| 53-44443 | 4/1978 | Japan | 524/439 |

*Primary Examiner*—Lewis T. Jacobs
*Attorney, Agent, or Firm*—Antonelli, Terry & Wands

[57] ABSTRACT

Occurence of crevice corrosion on metal surfaces in crevices is prevented by providing an anti-crevice corrosion sealant which comprises a rubbery substrate containing 5–350% by weight of fine zinc powder, 20–100% by weight of magnesium oxide, and 20–200% by weight of electrostatically charged fine graphite powder, each on the basis of the rubbery substrate, in the crevices between parts of stainless steel articles or aluminum alloy articles.

7 Claims, 4 Drawing Figures

ANTI-CREVICE CORROSION SEALANT AND METHOD FOR ANTI-CREVICE CORROSION

BACKGROUND OF THE INVENTION

This invention relates to an anti-crevice corrosion sealant for use in sealing parts in sea water conversion plants, pumps, refrigerators, heat exchangers, and their related pipings and also to a method for anti-crevice corrosion.

In pipings for transferring an aqueous medium such as sea water and industrial water, their joint parts are sealed with rubbery sheets or asbestos sheets or their rings, but there still remain fine crevices at the joint parts. At bolt-secured parts and jointed parts between one plane member and another in the ordinary machines and apparatuses, there remain likewise fine crevices.

In the fine crevices, mass transfer is difficult to occur, and a definite amount of the dissolved oxygen contained in the aqueous medium in the crevices is consumed for forming a passive state film on metal surfaces, but its supplementation is difficult. Thus, on the metal surfaces in the fine crevices, which will be hereinafter referred to as "crevice inner surfaces", we have such a fear that some of metal surfaces are exposed to the aqueous medium without coating with a passive state film due to unsatisfactory supplementation of dissolved oxygen. On the other hand, on the outer surfaces adjacent to the crevice inner surfaces complete passive state films are formed due to satisfactory supplementation of dissolved oxygen.

Under these circumstances the crevice inner surfaces take an electrochemically less noble electrode potential to the aqueous medium, whereas the outer surfaces adjacent to the crevice inner surfaces take an electrochemically noble electrode potential to the aqueous medium, and thus a potential difference arises between the crevice inner surfaces and the adjacent outer surfaces to activate and dissolve the crevice inner surfaces. Thus, on the adjacent outer surfaces reduction reaction (cathode reaction) of dissolved oxygen takes place correspondingly to the electric charges on the crevice inner surfaces. Furthermore, in the crevices, a hydrogen ion concentration is increased by the dissolution of crevice inner surfaces, and the aqueous medium in the crevices turns acidic. Under these situations, the passive state films on the crevice inner surfaces become unstable, and the films are dissolved, with the result that crevice corrosion is accelerated.

Generation of the crevice corrosion is due to the fact that the crevice inner surfaces are anodically polarized, whereas the adjacent outer surfaces are cathodically polarized to dissolve the crevice inner surfaces and the aqueous medium in the crevices turns acidic.

SUMMARY OF THE INVENTION

An object of the present invention is to provide a very effective anti-crevice corrosion sealant for preventing crevice corrosion liable to be generated in crevices between joint parts of plants or pumps for use in highly corrosive sea water or refrigerators, heat exchangers, and their related pipings, particularly made from stainless steel, and also to provide a method for anti-crevice corrosion with such a sealant.

The present invention provides an anti-crevice corrosion sealant which comprises a rubbery substrate containing 5-350% by weight of fine zinc powder, 20-100% by weight of magnesium oxide, and 20-200% by weight of electrostatically charged fine graphite powder, each on the basis of the rubbery substrate, and occurrence of crevice corrosion on metal surfaces in crevices is prevented by providing such a sealant in the crevices between joint parts of stainless steel articles or aluminum alloy articles.

The present invention will be described in detail below, referring to examples and drawings.

PREFERRED EMBODIMENTS OF THE INVENTION

Figure 1:
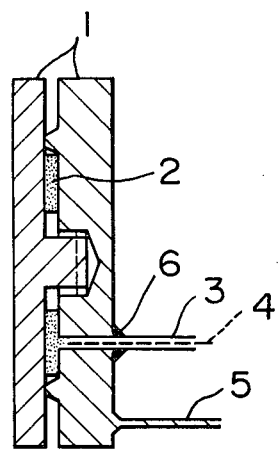
FIGS. 1 and 2 are cross-sectional views of test pieces for use in testing anti-crevice corrosion properties of the present anti-crevice corrosion sealant.

The present sealant comprises a rubbery substrate containing 5-350% by weight of fine zinc powders, 20-100% by weight of magnesium oxide, and 20-200% by weight of electrostatically charged fine graphite powder, each on the basis of the rubber substrate, as described above, and in the process that the inorganic metal ingredients of the present sealant are dissolved in an aqueous medium in preference to the sealed crevice inner surfaces and the adjacent outer surfaces, the sealant acts to prevent the aqueous medium in the crevices from turning acidic and to maintain the aqueous medium in a weakly alkaline state and stabilize the passive state film on the crevice inner surfaces.

Addition of fine zinc powder to the rubbery substrate is to prevent generation of potential difference due to polarization between the sealed crevice inner surfaces and the adjacent outer surfaces. The zinc added to and dispersed in the rubbery substrate is exposed to the aqueous medium on or near the surface, and when the exposed zinc comes in contact with the crevice inner surfaces, it cathodically polarizes the crevice inner surfaces and the adjacent outer surfaces, while the exposed zinc itself is anodically polarized and dissolved in the aqueous medium.

Since the crevice inner surfaces and the adjacent outer surfaces are cathodically polarized, no potential difference is generated. Thus, the crevice inner surfaces are not corroded and can be cathodically protected from corrosion together with the adjacent outer surfaces.

Zinc is also dissolved in an aqueous medium in preference to the metal surfaces and is converted to amorphous zinc hydroxide which diffuses into the crevices. At the same time, the aqueous medium in crevices turns weakly alkaline and stabilizes the passive state films on the crevice inner surfaces.

Below 5% by weight of the fine zinc powder on the rubber substrate, the rubber substrate of the sealant is less effective for preventing crevice corrosion, whereas above 350% by weight, cross-linking reaction of the rubbery substrate is accelerated to deteriorate the resiliency of the rubbery substrate. Thus, the amount of fine zinc powder is limited to 5-350% by weight.

Addition of magnesium oxide to the rubbery substrate is to give a substantial hygroscopicity to the rubbery substrate and to effectively consume the fine zinc powder, since the zinc is dissolved out in the form of amorphous zinc hydroxide. Below 20% by weight, magnesium oxide is less effective, whereas above 100% by weight, it deteriorates the resiliency of the rubbery substrate. Thus, the amount of magnesium oxide is limited to 20–100%.

Electrostatically charged fine graphite powder linearly links one another in the rubbery substrate owing to its polarity and helps to electrochemically consume the fine zinc powder dispersed in the rubbery substrate. Less than 20% by weight of it is less effective, whereas more than 200% by weight is not economical. Thus, the amount of the fine graphite powder is limited to 20–200% by weight.

The fine zinc powder and fine graphite powder preferably take spherical or polygonal shapes in order not to deteriorate the sealing effect when added to the rubbery substrate, and also preferably take fine sizes from the viewpoint of uniform distribution. However, the diameter of these fine powders of less than 0.0001 mm is not economical, whereas the diameter of more than 0.1 mm deteriorates the sealing effect. Thus, the diameter is preferably 0.0001–0.1 mm.

The rubbery substrate must have a good resistance to an aqueous medium such as sea water and cause no crevice corrosion on the metal in contact with the rubbery substrate in seal water, and preferably includes ethylenepropylene rubber (EPR) where the cross-linking reaction of rubbery substance is carried out with an organic peroxide, chloroprene rubber (CR) where the cross-linking reaction is carried out with a metal oxide.

The present invention will be described below, referring to Test Examples.

Test Example 1

Figure 2:
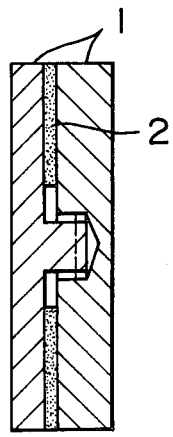

Commercially available stainless steel (SUS 304: 0.07% C, 0.56% Si, 1.31% Mn, 18.30% Cr and 9.14% Ni) was fabricated into disk test pieces 1 shown in FIGS. 1 and 2, and crevice corrosion test pieces were assembled from these disk test pieces 1 by means of sealant 2 as shown in Table 1. The crevice corrosion test pieces were dipped in artificial sea water at 50° C. for 30 days and electrode potentials on the crevice inner surfaces were measured by a potentiometer, and at the same time, changes in the liquid in the crevices were investigated.

In FIGS. 1 and 2, numeral 3 is a teflon tube, 4 and 5 are electrodes connected to a potentiometer (not shown in the drawing), and 6 is a sealer (Araldite resin, an epoxy resin made by Ciba Products Co.).

The results are shown in Table 2, where the corrosion area ratio is a ratio of corroded area to the crevice inner surface area of 2512 mm$^2$, and the latent period (days) is a period until the crevice corrosion is generated, where the crevice corrosion is liable to occur at the edges of the crevice, and reddish brown rusts appear at the edge, and thus the latent period is evaluated in days before the rusts have been found. Thus, the latent period of 30 days means that no corrosion was generated in the test.

TABLE 1

| Sealant No. | Rubbery substrate | Fine zinc powder | Electrostatically charged fine graphite powder | Magnesium oxide |
|---|---|---|---|---|
| | | Ingredient (%) | | |
| 1 | CR* | — | — | — |
| 2 (the invention) | | 5 | 35 | 60 |
| 3 (the invention) | | 50 | 40 | 70 |
| 4 (the invention) | | 150 | 40 | 70 |

TABLE 1-continued

| Sealant No. | Rubbery substrate | Fine zinc powder | Electrostatically charged fine graphite powder | Magnesium oxide |
|---|---|---|---|---|
| | | Ingredient (%) | | |
| 5 (the invention) | | 250 | 70 | 80 |
| 6 (the invention) | | 350 | 75 | 70 |
| 7 | EPR** | — | — | — |
| 8 (the invention) | | 5 | 40 | 70 |
| 9 (the invention) | | 40 | 45 | 70 |
| 10 (the invention) | | 180 | 50 | 80 |
| 11 (the invention) | | 350 | 70 | 70 |
| 12 (the invention) | NRB*** | — | — | — |
| 13 | | 5 | — | — |
| 14 | | 20 | — | — |
| 15 | | 100 | — | — |

*chloroprene rubber
**ethylene-propylene rubber
***nitrile-butadiene rubber

TABLE 2

| Sealant No. | Corrosion area ratio, (%) (A) | Anti-corrosion ratio, (%) (P = 100-A) | Corrosion form | Latent period (Days) |
|---|---|---|---|---|
| | Crevice corrosion state | | | |
| 1 | 13.27 | 86.73 | Continued pitting corrosion | 2 |
| 2 | 8.95 | 91.05 | Continued pitting corrosion | 5 |
| 3 | 8.03 | 91.97 | Continued pitting corrosion | 7 |
| 4 | 1.10 | 98.90 | Fine pitting corrosion point | 15 |
| 5 | 0 | 100 | — | 30 |
| 6 | 0 | 100 | — | 30 |
| 7 | 12.50 | 87.5 | Continued pitting corrosion | 1 |
| 8 | 10.16 | 89.84 | Continued pitting corrosion | 3 |
| 9 | 7.75 | 92.25 | Continued pitting corrosion | 10 |
| 10 | 0 | 100 | — | 30 |
| 11 | 0 | 100 | — | 30 |
| 12 | 20.05 | 79.95 | Deep pitting corrosion | 2 |
| 13 | 15.20 | 84.80 | Deep pitting corrosion | 2 |
| 14 | 15.36 | 84.64 | Deep pitting corrosion | 2 |
| 15 | 7.20 | 92.80 | Continued pitting corrosion | 4 |

Note:
P (%) = 100-A

Test Exaample 2

Various test stainless steels having compositions shown in Table 3 were fabricated into sets of disk crevice corrosion test pieces in the same manner as in Test Example 1, with sealants shown in Table 4 in the crevices, and the test pieces were dipped in artificial sea water at 50° C. for 30 days to conduct crevice corrosion test.

The results are shown in Table 5, where it was found that pitting corrosion took place with rust generation a few days after the dipping when the conventional sealant was provided in the crevice, whereas no corrosion was observed after the dipping period of 30 days when the present sealant was provided in the crevice.

TABLE 3

| Test stainless steel No. | | Composition (%) | | | | | |
| --- | --- | --- | --- | --- | --- | --- | --- |
| | | C | Si | Mn | Cr | Ni | Mo |
| 1 | Ferrite | 0.15 | 0.79 | 1.23 | 5.02 | — | — |
| 2 | + | 0.14 | 0.85 | 1.65 | 11.20 | — | — |
| 3 | martensite | 0.20 | 0.96 | 1.35 | 13.50 | — | — |
| 4 | Austenite | 0.14 | 0.98 | 1.42 | 17.10 | 4.50 | — |
| 5 | | 0.07 | 0.56 | 1.31 | 18.30 | 8.14 | — |
| 6 | | 0.08 | 0.79 | 1.55 | 17.21 | 12.30 | 2.53 |
| 7 | | 0.05 | 0.86 | 1.73 | 30.06 | — | 2.05 |
| 8 | | 0.05 | 4.06 | — | 14.50 | 70.60 | — |

TABLE 4

| Sealant | Rubbery substrate | Ingredient (wt %) | | |
| --- | --- | --- | --- | --- |
| | | Fine zinc powder | Electrostatically charged fine graphite powder | Magnesium oxide |
| 1 | EPR | — | — | — |
| 2 (the invention) | | 40 | 45 | 70 |
| 3 (the invention) | | 350 | 70 | 70 |
| 4 | NBR | — | — | — |
| 5 | CR | — | — | — |
| 6 (the invention) | | 350 | 75 | 70 |

TABLE 5

| Crevice corrosion test | | Crevice corrosion state | | |
| --- | --- | --- | --- | --- |
| Sealant No. | Stainless Steel No. | A (%) | Corrosion from | Latent period (days) |
| 1 | 5 | 12.50 | Continued pitting corrosion and entire corrosion | 1 |
| 2 | 5 | 7.75 | — | 10 |
| 3 | 5 | 0 | — | 30 |
| 4 | 5 | 20.05 | Deep pitting corrosion | 2 |
| 5 | 5 | 13.27 | Continued pitting corrosion | 2 |
| 6 | 5 | 0 | — | 30 |
| 3 | 1 | 0 | — | 30 |
| 3 | 2 | 0 | — | 30 |
| 6 | 3 | 0 | — | 30 |
| 6 | 4 | 0 | — | 30 |
| 6 | 5 | 0 | — | 30 |
| 3 | 6 | 0 | — | 30 |
| 3 | 7 | 0 | — | 30 |
| 3 | 8 | 0 | — | 30 |

Figure 3:
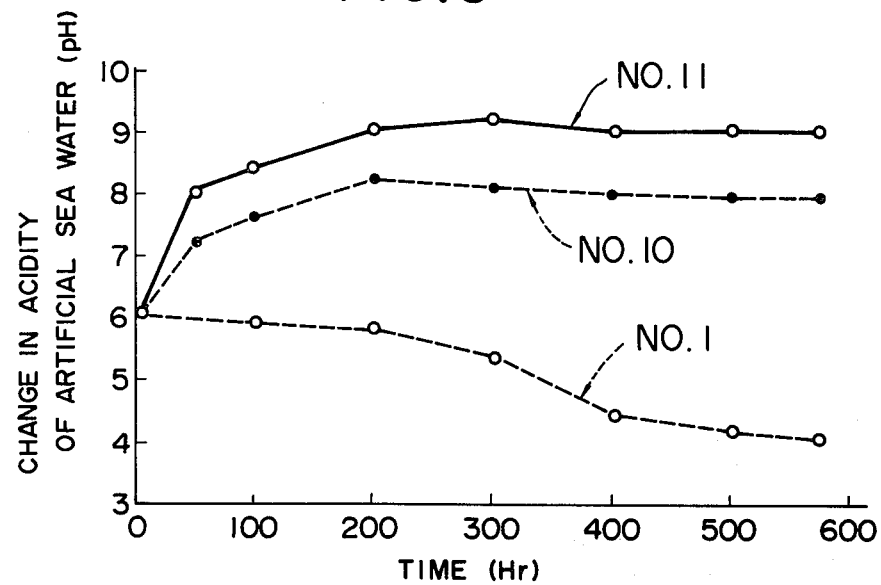
FIG. 3 is a diagram showing influences of sealants upon artificial sea water in crevices.

In FIG. 3, influences of sealant upon the artificial sea water in the crevices are shown. From FIG. 3 it is seen that with the sealant No. 1 as given in Table 1 the pH of the artificial sea water in the crevices turns gradually acidic and the passive state film on the crevice inner surfaces of stainless steel (SUS 304) becomes unstable, whereas with the sealants Nos. 10 and 11 as given in Table 1 the pH of the artificial sea water in the crevices turns alkaline and the passive state film on the crevice inner surfaces of metal becomes stable.

Figure 4:
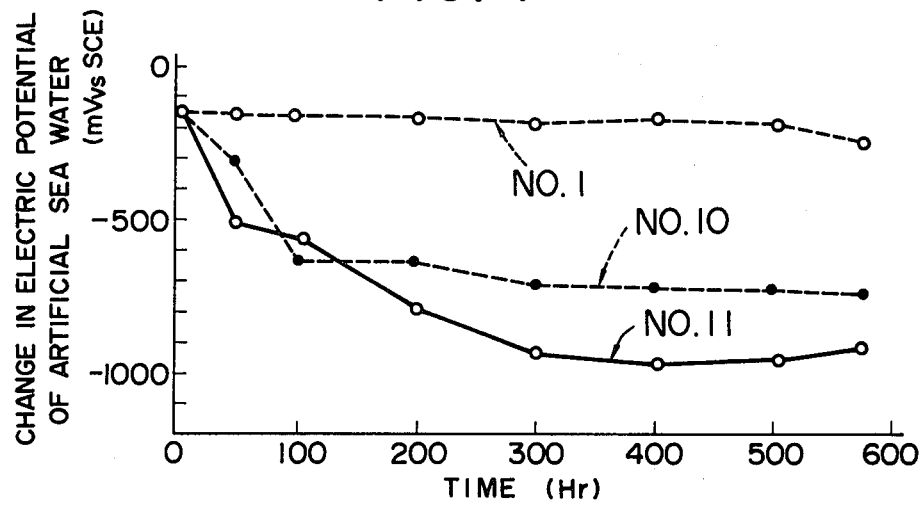
FIG. 4 is a diagram showing influences of sealants upon electrode potential on metal surfaces in crevices.

In FIG. 4, influences of sealants upon the electrode potential on the crevice inner surfaces of metal are shown. From FIG. 4 it is seen that the sealants Nos. 10 and 11 as given in Table 1 turn the electrode potential on the crevice inner surfaces of stainless steel (SUS 304) considerably less noble to make polarization down to the corrosionimmunity potential range, whereas no such action is observable with the sealant No. 1.

As described above, the present invention provides a very effective anti-crevice corrosion sealant for preventing crevice corrosion liable to be generated in crevices between joint parts of plants or pumps for use in highly corrosive sea water or refrigerators, heat exchangers and their related pipings for use in a corrosive atmosphere, particularly made from stainless steel, and also provide a very effective method for anti-crevice corrosion with such a sealant.

What is claimed is:

1. An anti-crevice corrosion sealant which comprises a rubbery substrate containing 5–350% by weight of fine zinc powder, 20–100% by weight of magnesium oxide, and 20–200% by weight of electrostatically charged fine graphite powder, each on the basis of the rubbery substrate.

2. The anti-crevice corrosion sealant according to claim 1, wherein the rubbery substrate is crosslinked with an organic peroxide.

3. The anti-crevice corrosion sealant according to claim 2, wherein the rubbery substrate is ethylene-propylene rubber.

4. The anti-crevice corrosion sealant according to claim 1, wherein the rubbery substrate is crosslinked with a metal oxide.

5. The anti-crevice corrosion sealant according to claim 4, wherein the rubbery substrate is chloroprene rubber.

6. The anti-crevice corrosion sealant according to claim 1, wherein the fine zinc powder and the fine graphite powder are in spherical or polygonal forms having diameters of 0.0001–0.1 mm.

7. A method for anti-crevice corrosion, which comprises providing an anti-crevice corrosion sealant which comprises a rubbery substrate containing 5–350% by weight of fine zinc powder, 20–100% by weight of magnesium oxide, and 20–200% by weight of electrostatically charged fine graphite powder, each on the basis of the rubbery substrate in crevices of a stainless steel article containing 5–40% Cr, the balance being iron and other ingredients.

* * * * *